US008215219B2

(12) United States Patent
Rummel et al.

(10) Patent No.: US 8,215,219 B2
(45) Date of Patent: Jul. 10, 2012

(54) FOOD PRODUCT SLICER WITH GAUGE PLATE BASED SHUTDOWN OPERATION

(75) Inventors: Samuel A. Rummel, Pooler, GA (US); Shahram Shariff, Savannah, GA (US)

(73) Assignee: Premark FEG L.L.C., Wilmington, DE (US)

(*) Notice: Subject to any disclaimer, the term of this patent is extended or adjusted under 35 U.S.C. 154(b) by 812 days.

(21) Appl. No.: 12/323,580

(22) Filed: Nov. 26, 2008

(65) Prior Publication Data

US 2009/0133588 A1 May 28, 2009

Related U.S. Application Data

(60) Provisional application No. 60/990,480, filed on Nov. 27, 2007.

(51) Int. Cl.

| | |
|---|---|
| ***B23D 19/00*** | (2006.01) |
| ***B23D 45/00*** | (2006.01) |
| ***B27B 5/00*** | (2006.01) |
| ***B26D 1/00*** | (2006.01) |
| ***B26D 7/22*** | (2006.01) |

(52) U.S. Cl. ................. 83/717; 83/13; 83/62.1; 83/247; 83/268; 83/474; 83/703; 83/707; 83/713; 83/714; 83/715; 83/716; 83/730; 83/932; 99/537

(58) Field of Classification Search .................... 99/537; 83/13, 62.1, 474, 730, 247, 268, 703, 707, 83/713–717, 932
See application file for complete search history.

(56) References Cited

U.S. PATENT DOCUMENTS

| | | | | | |
|---|---|---|---|---|---|
| 2,075,554 | A | * | 3/1937 | Strachan | 83/730 |
| 3,320,990 | A | * | 5/1967 | Longin | 83/59 |
| 3,613,754 | A | * | 10/1971 | Hartley | 83/718 |
| 3,704,736 | A | * | 12/1972 | Pratley | 83/397 |
| 3,938,602 | A | * | 2/1976 | Sly et al. | 177/116 |
| 4,015,494 | A | * | 4/1977 | Spooner et al. | 83/76 |
| 4,226,147 | A | * | 10/1980 | Kumzi | 83/37 |
| 4,321,847 | A | * | 3/1982 | Dillon | 83/77 |
| 4,397,206 | A | * | 8/1983 | Czala | 83/399 |
| 4,793,228 | A | * | 12/1988 | Etter et al. | 83/155.1 |
| 4,813,316 | A | * | 3/1989 | Johnson et al. | 83/42 |
| 5,107,731 | A | * | 4/1992 | Kent | 83/91 |
| 5,241,885 | A | * | 9/1993 | Kuchler | 83/76.7 |

(Continued)

FOREIGN PATENT DOCUMENTS

WO 2007/002819 1/2007

OTHER PUBLICATIONS

Instructions—Model 2812 & 2912 Slicers; Form 34454; Feb. 2000; 7 pgs; Hobart; Troy, Ohio, www.hobartcorp.com.

(Continued)

*Primary Examiner* — Gene Kim
*Assistant Examiner* — Alexander Niconovich
(74) *Attorney, Agent, or Firm* — Thompson Hine LLP

(57) ABSTRACT

A food product slicer includes a carriage assembly is mounted to the base for reciprocal movement back and forth past a cutting edge of a knife. An adjustable gauge plate provides variable slice thickness for food product carried by the carriage assembly. During automatic slicing, when the gauge plate is moved from the open position to the closed position, a slicer controller automatically shuts down the carriage drive in a controlled manner that causes the carriage to stop at its most forward position.

12 Claims, 3 Drawing Sheets

U.S. PATENT DOCUMENTS

| | | | | | |
|---|---|---|---|---|---|
| 5,245,898 | A * | 9/1993 | Somal et al. | 83/58 |
| 5,461,957 | A * | 10/1995 | Koch et al. | 83/713 |
| 5,509,337 | A * | 4/1996 | Norman et al. | 83/546 |
| 5,615,591 | A * | 4/1997 | Scherch et al. | 83/399 |
| 5,630,348 | A * | 5/1997 | Kuchler | 83/713 |
| 5,666,866 | A * | 9/1997 | Huang et al. | 83/77 |
| 5,687,626 | A * | 11/1997 | Scherch et al. | 83/719 |
| 5,862,730 | A * | 1/1999 | Cartwright et al. | 83/42 |
| 5,970,840 | A * | 10/1999 | Yan et al. | 83/717 |
| 6,092,448 | A * | 7/2000 | Cartwright et al. | 83/42 |
| 6,209,438 | B1 * | 4/2001 | Mitchell et al. | 83/729 |
| 6,845,697 | B2 * | 1/2005 | Kovacs | 83/62 |
| 6,931,973 | B2 * | 8/2005 | Kuchler | 83/13 |
| 7,073,421 | B1 * | 7/2006 | Verhalen et al. | 83/174 |
| 7,398,718 | B2 * | 7/2008 | Kovacs | 83/42 |
| 7,464,632 | B2 * | 12/2008 | Zeeb et al. | 83/720 |
| 7,549,363 | B2 * | 6/2009 | Rote et al. | 83/707 |
| 7,637,191 | B2 * | 12/2009 | Zeeb et al. | 83/703 |
| 7,721,638 | B2 * | 5/2010 | Verhalen et al. | 83/718 |
| 7,832,317 | B2 * | 11/2010 | Zeeb et al. | 83/247 |
| 2002/0050198 | A1 * | 5/2002 | Kuchler | 83/76.8 |
| 2002/0069737 | A1 * | 6/2002 | Zhu | 83/91 |
| 2003/0079589 | A1 * | 5/2003 | Kovacs | 83/42 |
| 2004/0055439 | A1 * | 3/2004 | Lindee et al. | 83/932 |
| 2005/0045007 | A1 * | 3/2005 | Mueller | 83/13 |
| 2005/0132854 | A1 * | 6/2005 | Kovacs | 83/13 |
| 2006/0150791 | A1 * | 7/2006 | Chase et al. | 83/42 |
| 2007/0142959 | A1 * | 6/2007 | Rummel et al. | 700/160 |
| 2008/0083310 | A1 * | 4/2008 | Verhalen et al. | 83/399 |
| 2008/0190305 | A1 * | 8/2008 | Zhu et al. | 99/537 |
| 2009/0007745 | A1 * | 1/2009 | Rummel et al. | 83/487 |
| 2009/0064876 | A1 * | 3/2009 | Feizi et al. | 99/537 |
| 2009/0071310 | A1 * | 3/2009 | Rummel et al. | 83/707 |
| 2009/0173201 | A1 * | 7/2009 | Zhu et al. | 83/474 |
| 2009/0193946 | A1 * | 8/2009 | Bondarowicz et al. | 83/13 |
| 2009/0211417 | A1 * | 8/2009 | Rummel et al. | 83/74 |
| 2009/0255418 | A1 * | 10/2009 | Rummel et al. | 99/537 |
| 2010/0089254 | A1 * | 4/2010 | Gosis et al. | 99/537 |
| 2011/0162498 | A1 * | 7/2011 | Rummel et al. | 83/76.1 |

OTHER PUBLICATIONS

PCT, International Search Report and Written Opinion, PCT/US2008/084827 (Feb. 17, 2009).

PCT, International Preliminary Report on Patentability, PCT/US2008/084827 (Jun. 10, 2010).

* cited by examiner

FOOD PRODUCT SLICER WITH GAUGE PLATE BASED SHUTDOWN OPERATION

CROSS REFERENCE TO RELATED APPLICATIONS

This application claims the benefit of U.S. Application No. 60/990,480 filed Nov. 27, 2007 and herein incorporated by reference.

TECHNICAL FIELD

This application relates generally to food product slicers of the type commonly used to slice bulk food products and, more specifically, to a shutdown operation initiated by closure of the gauge plate of a food product slicer.

BACKGROUND

Typical reciprocating food slicers have a rotatable, circular or disc-like slicing blade, an adjustable gauge plate for determining the thickness of the slice and a carriage for supporting the food as it is moved back and forth past the cutting edge of the knife during slicing. A drive motor is typically linked to drive the carriage back and forth during an automatic slicing operation carried out by a controller of the slicer. The gauge plate is situated along the edge of the knife toward the front of a slicing stroke and is laterally movable with respect to the knife for determining the thickness of the slices to be cut. A mechanism such as an adjustment knob for setting a spacing between the plane of the gauge plate surface and the plane of the plane of the knife edge for the purpose of slicing is also typically provided so that operators can select a thickness of slices to be produced. Movement of the gauge plate is generally a linear movement of the plane of the gauge plate relative to the plane of the knife edge. Thus, movement of the gauge plate handle can be considered to move the gauge plate in a manner to make slice thickness adjustments. The gauge plate has a "closed" position in which the position of the gauge plate is such that slices will not be cut even if the carriage and associated food product are moved back and forth past the knife. When the gauge plate is "open" a range of positions provide for slices of varying thickness In prior slicers, when the gauge plate of an automatic food slicer was closed from its open position, the knife motor was shut OFF and the food carriage transport system was stopped immediately (e.g., drive motor shut off), such that the carriage could potentially stop at any point along the stroke length without regard for the then current direction of travel of the carriage.

SUMMARY

In one aspect, a food product slicer includes a base and a knife mounted for rotation relative to the base. A carriage assembly is mounted to the base for reciprocal movement back and forth past a cutting edge of the knife. An adjustable gauge plate is mounted for movement between a closed or zero position that prevents slicing and multiple open positions that permit slicing at respective thicknesses. During an automatic slicing operation the carriage is automatically driven back and forth past the knife to slice food product loaded on the carriage. During automatic slicing, when the gauge plate is moved from the open position to the closed position, a slicer controller automatically shuts down the carriage drive in a controlled manner that causes the carriage to stop at its most forward position.

In another aspect a method is provided for operating a slicer of the type including a rotatable knife, a carriage assembly mounted for reciprocal movement back and forth past a cutting edge of the knife, the carriage assembly having a full stroke length that extends from a most forward position toward a front side of the base and a end of stroke turnaround position toward a rear side of the base, a drive for automatically moving the carriage for automated food product slicing, and a gauge plate having closed and open positions. The method involves: automatically moving the carriage assembly back and forth for automated slicing while the gauge plate is open; detecting closure of the gauge plate; responsive to detected closure of the gauge plate, automatically effecting a shutdown operation during which the drive is controlled to bring the carriage assembly to a stop at a location substantially corresponding to the most forward position of the carriage assembly.

DETAILED DESCRIPTION

Figure 1:
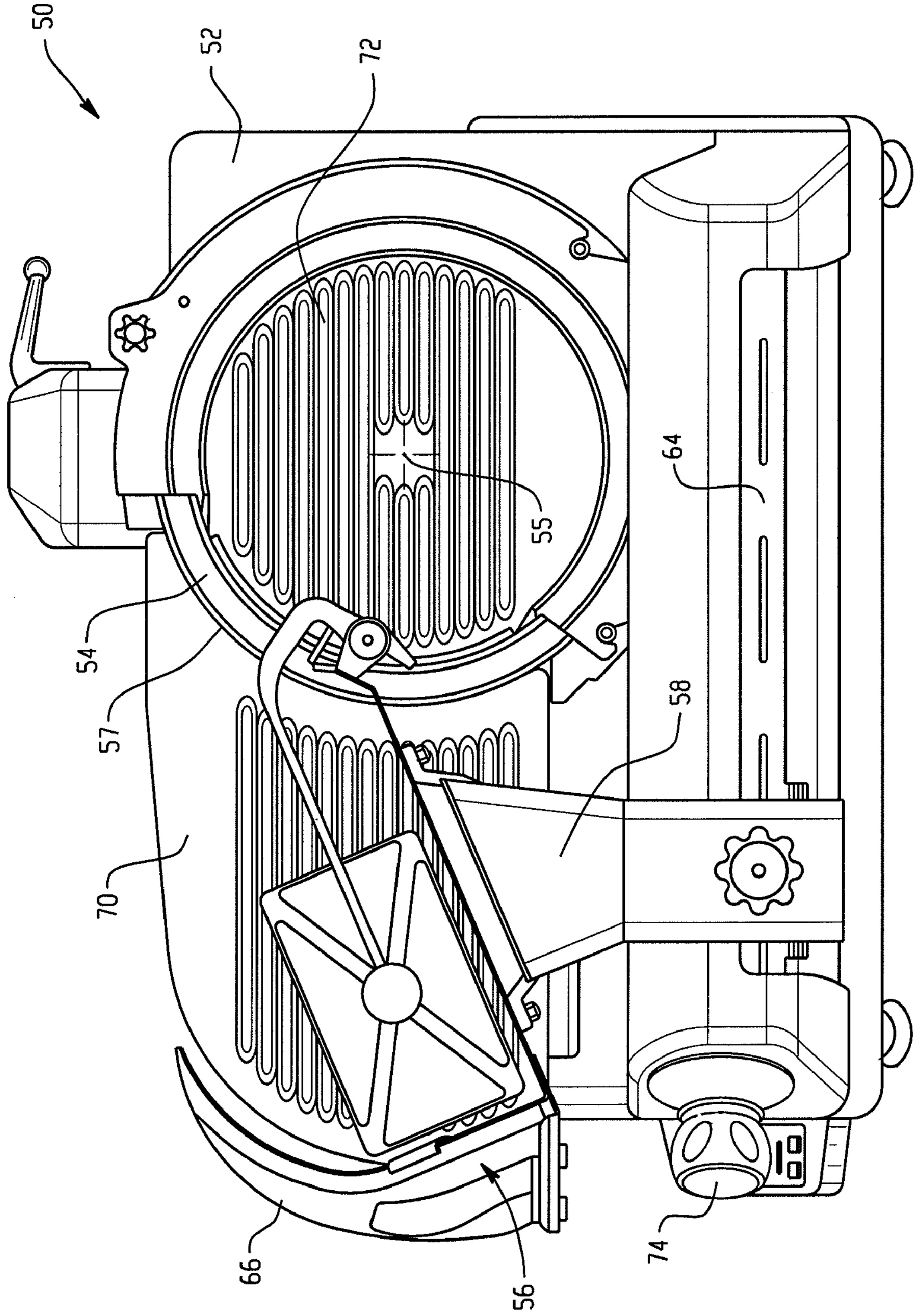
FIG. 1 is a right side elevation of a slicer.

Referring to FIG. 1, a food product slicer 50 includes a housing or base 52 and a circular, motor-driven slicing knife 54 that is mounted to the housing for rotation about an axis 55. The left side of FIG. 1 is generally referred to as the front side of the slicer (which is where an operator stands for slicing), the right side of FIG. 1 is generally referred to as the rear side of the slicer and FIG. 1 depicts a right side view of the slicer. A food product can be supported on a manually operable food carriage 56 which moves the food product to be sliced past the cutting edge 57 of the rotating slicing knife 54. The food carriage 56 reciprocates from left to right relative to FIG. 1, along a linear path so that the lower end of the bulk food product slides along the surface of the gauge plate 70, is cut by the knife 54 and then slides along a knife cover plate 72. Food carriage 56 includes a tray mounted on a tray arm 58 that orients the food carriage tray at the appropriate angle (typically perpendicular) to the cutting edge plane. The food carriage reciprocates in a slot 64 at a lower portion of the housing 52 and a handle 66 is mounted to the food carriage 56. The handle is graspable by a user and can be used to manually move the food carriage. The carriage may also be automatically driven (e.g., as by a motor drive or other prime mover). A handle or knob 74 for adjusting the gauge plate to control slice thickness is also shown.

The illustrated position of the food carriage 56 is the most forward or front position relative to the slicer knife 54, typically the starting position for a slicing stroke. This position is also sometimes referred to as the home position of the carriage. The most rearward or stroke turnaround position is at the opposite side of the slicer knife.

Repeatability of slice thickness is the control of slice thickness within a similar product, for example, if a particular machine slices ham at index setting of 4, on the adjustment knob, and that thickness is desirable, the next time a customer comes back to have more ham sliced and that if the index is set on 4 it will cut the same thickness. This theory will also apply from machine to machine repeatability. Prior techniques provided repeatability within a certain degree but not as consistent as desired. The machine to machine repeatability was generally not present.

Figure 2:
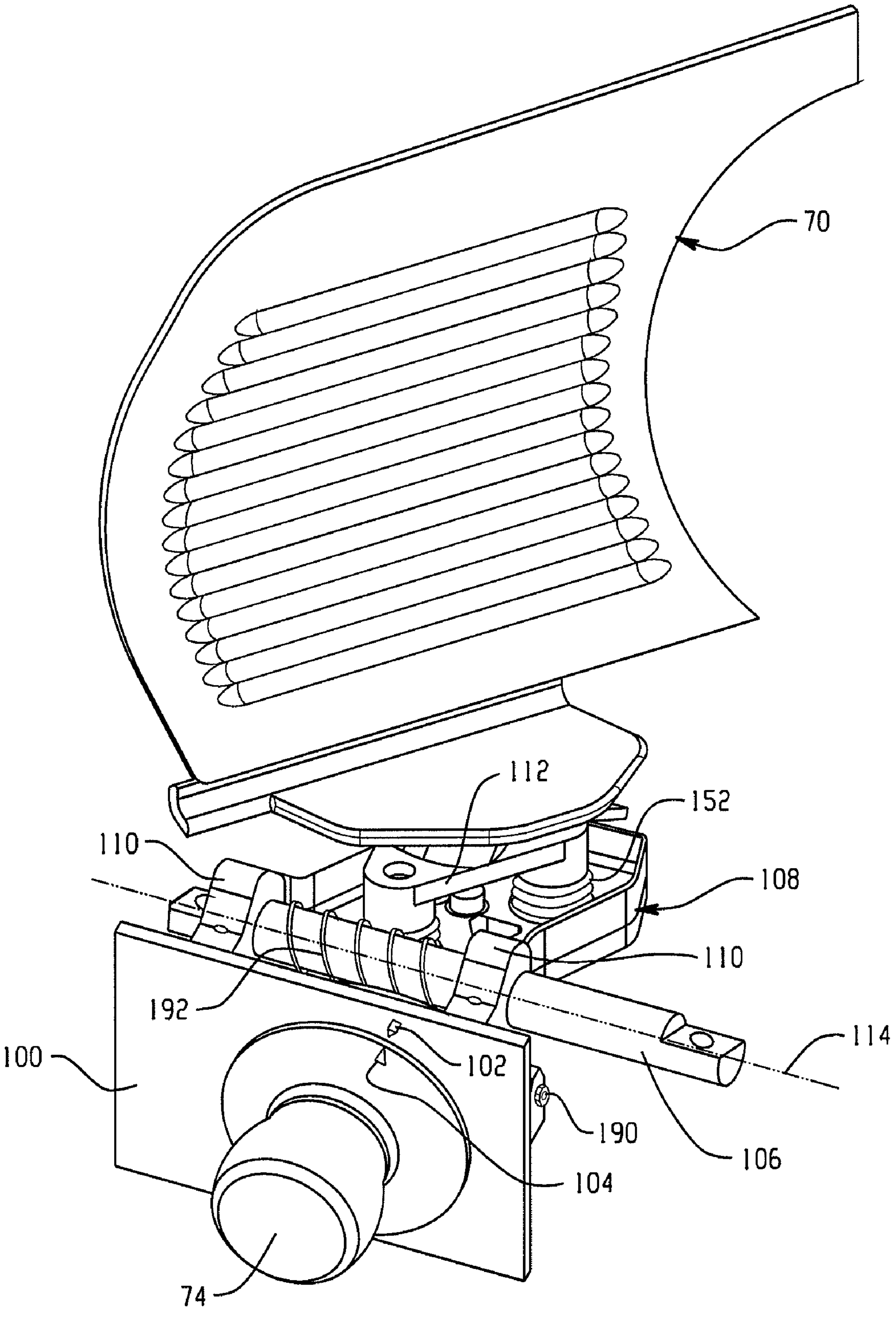
FIG. 2 is a perspective view of a gauge plate system.

Referring to FIG. 2, where a portion of the slicer housing is shown as 100, a gauge plate system includes rotatable handle assembly with handle 74. The housing 100 includes a zero position indicant 102 and the handle assembly includes a corresponding zero position indicant 104. Though not shown, the handle assembly will typically include other thickness indicants, such a visible numbers and/or a series of hash marks etc. to which an operator can refer when selecting a desired slice thickness. Internal of the slicer a slide rod 106 is fixed to the slicer base (e.g., by fasteners through end openings of the slide rod). An index slider 108 includes mount brackets 110 with openings therethrough enabling the index slider to move along the length of the slide rod 106. The gauge plate 70 is connected to the index slider 108 via an intermediate plate 112. In normal slicer operation the position of the intermediate plate 112 relative to the index slider 108 is fixed. The handle 74 is linked with the index slider 108 such that rotation of the handle 74 causes the index slider to move axially along the slide rod 106. The axis 114 of the slide rod is arranged such that movement of the index slider 108 causes the plane of the gauge plate to move relative to the knife edge cutting plane in a desired manner to adjust slice thickness. Numerous variations for the gauge plate adjustment mechanism exist.

Figure 3:
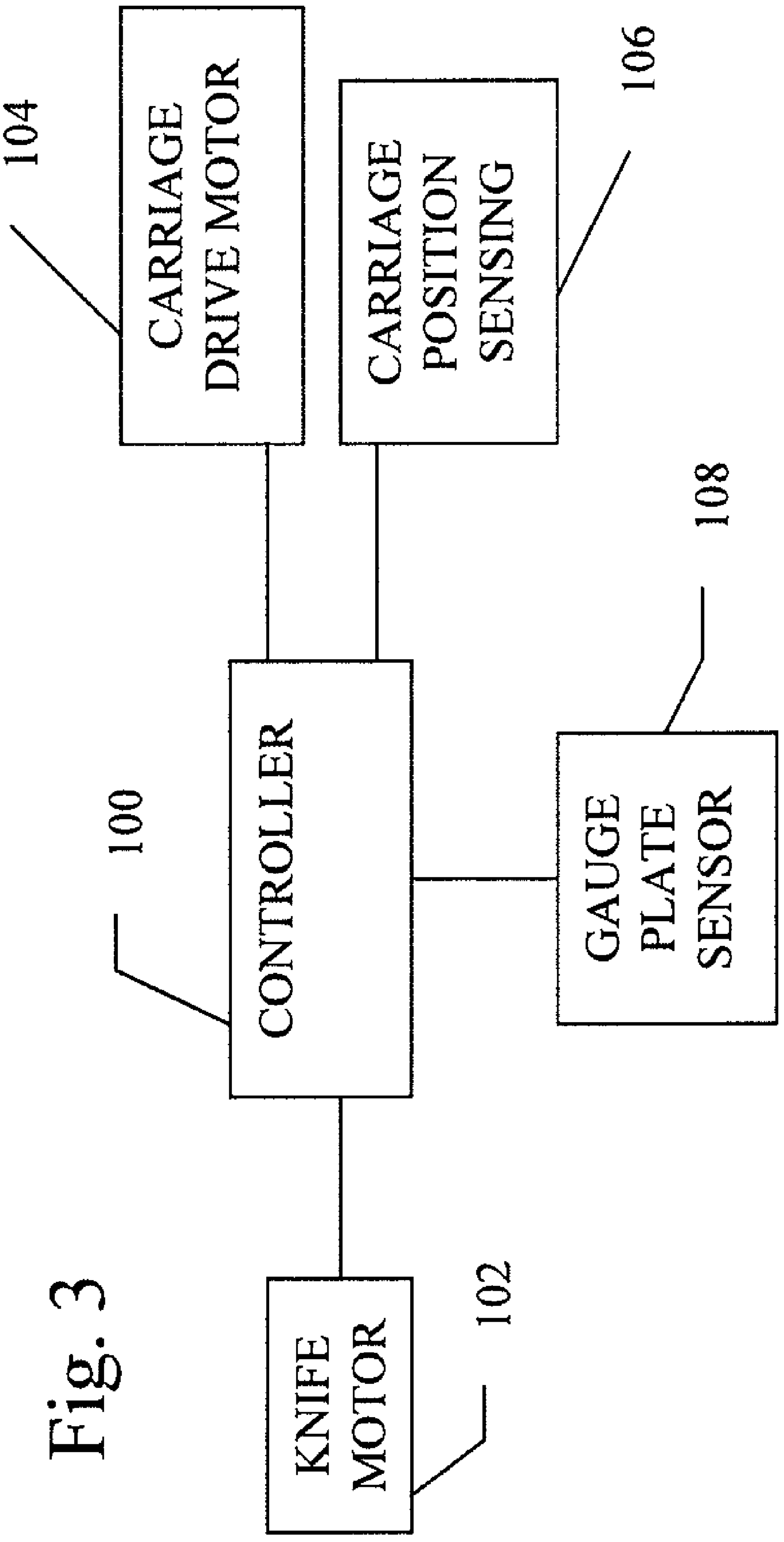
FIG. 3 is a schematic depiction of a control system.

An exemplary slicer control system is illustrated in FIG. 3, and includes a controller 100 (e.g., processor based controller and associated printed circuit board), a slicer knife motor 102, a carriage drive motor 104 and associated position sensing system 106. In one embodiment the carriage drive motor 104 may be a linear motor with one part connected directly to the carriage, and the sensing system 106 may be a linear encoder arrangement and/or one or more position switches such as end of stroke and start of stroke switches. In another embodiment the carriage drive motor 104 may be a rotary motor linked to the carriage through a belt or multi-linkage drive system, and the encoder arrangement may be a rotary encoder. Other carriage drive systems are contemplated. As shown, a sensor 108 for determining whether the gauge plate is in the closed position is also provided. The sensor 108 may detect the actual gauge plate closed position (e.g., by mechanical closure of a switch contacted by the plate or by the plate triggering an optical or magnetic sensor), or may detect the corresponding closed or zero position of some other component of the gauge plate adjustment assembly (e.g., the adjustment handle or some other moving component of the assembly).

The slicer may be automatic only, or may include both manual and automatic modes. During automatic slicing, the drive motor 104 moves the carriage back and forth past the slicer knife to repeatedly slice food product loaded on the carriage, with the thickness of slices determined by the open position of the gauge plate. When the gauge plate of the food slicer is closed from its open position, the control system operates such that the food carriage tray will automatically return to its most forward or home position (e.g., by continuing to energize the carriage drive motor in a controlled manner while tracking carriage position and then turning OFF the carriage drive motor). The knife motor will be turned OFF immediately or after it has timed out (e.g., after shut down of the carriage drive motor, simultaneous with shut down of the carriage drive motor, or even before shut down of the carriage drive motor).

The action of closing the food slicer gauge plate is typically an action taken when food slicing has been completed. The benefit of automatically returning the food product carriage back to the most forward or home position is that an operational step is eliminated before loading or unloading food product to or from the carriage tray and/or to prepare for a next slicing operation (e.g., typically the operated pulls the carriage to the most forward position for loading and unloading of bulk food product before beginning a next slicing operation).

In one embodiment, the controller effects gradual decrease in drive motor energization magnitude and/or drive motor energization time during the shutdown operation to bring the carriage assembly to a controlled stop at the most forward position. In one implementation, the controller controls motor energization to bring the carriage assembly to a stop in accordance with a predefined speed reduction profile, such as a sinusoidal speed reduction profile.

In one embodiment, which may or may not be combined with the speed reduction profile technique, the controller may simply complete the then current slice and return reciprocation that is in process when the gauge plate is closed. For example, if the gauge plate is closed during a slicing direction movement of the carriage, the motor is controlled such that the carriage completes the slicing movement to the end of stroke turnaround position, turns around and then returns and stops at the most forward position. On the other hand, if the gauge plate is closed during the return movement of the carriage, the motor is controlled such that the carriage simply completes the return movement all the way to the most forward position.

The controller may be configured such that once the shutdown operation is started by gauge plate closure, the shutdown operation will complete even if the gauge plate is subsequently opened again before the carriage assembly comes to a stop at the most forward position.

It is to be clearly understood that the above description is intended by way of illustration and example only and is not intended to be taken by way of limitation. Variations are possible.

What is claimed is:

1. A food product slicer, comprising:

a base;

a knife mounted for rotation relative to the base;

a carriage assembly mounted to the base for reciprocal movement back and forth past a cutting edge of the knife, the carriage assembly having a full stroke length that extends from a most forward position toward a front side of the base and a end of stroke turnaround position toward a rear side of the base;

a drive for automatically moving the carriage for automated food product slicing;

a carriage position sensing arrangement for determining position of the carriage assembly;

an adjustable gauge plate mounted for movement between a closed position that prevents slicing and multiple open positions that permit slicing at respective thicknesses;

a member for varying position of the gauge plate between the closed and open positions;

a gauge plate closure sensing arrangement for detecting whether the gauge plate is in the closed position; and a controller operatively connected with the drive, the carriage position sensing arrangement and the gauge plate closure sensing arrangement, the controller configured such that, during movement of the carriage assembly for automated slicing, and upon the gauge plate closure sensing arrangement detecting that the gauge plate is in the closed position, the controller initiates a shutdown operation and effects operation of the drive to bring the carriage assembly to a stop at a location substantially corresponding to the most forward position of the carriage assembly.

2. The slicer of claim 1 wherein the controller is configured such that the controller monitors input from the carriage position sensing arrangement during the shutdown operation.

3. The slicer of claim 1 wherein the gauge plate closure sensing arrangement comprises one of a mechanical sensor, an optical sensor or a magnetic sensor.

4. The slicer of claim 2 wherein the drive includes a motor, the controller controls motor energization to bring the carriage assembly to a stop at a location substantially corresponding to the most forward position of the carriage assembly.

5. The slicer of claim 4 wherein the controller effects gradual decrease in motor energization magnitude during the shutdown operation.

6. The slicer of claim 4 wherein the controller effects gradual decrease in motor energization time during the shutdown operation.

7. The slicer of claim 4 wherein the controller effects gradual decrease in both motor energization magnitude and motor energization time during the shutdown operation.

8. The slicer of claim 4 wherein the controller is configured such that, once the shutdown operation has begun, if the gauge plate is moved to the open position the shutdown operation will continue and complete.

9. The slicer of claim 4 wherein the controller controls motor energization to bring the carriage assembly to a stop in accordance with a predefined speed reduction profile.

10. The slicer of claim 9, wherein the predefined speed reduction profile is a sinusoidal speed reduction profile.

11. The slicer of claim 1 wherein during the shutdown operation the controller effects operation of the drive to bring the carriage assembly to a stop at a location substantially corresponding to the most forward position of the carriage assembly at the end of a then current slice and return reciprocation operation.

12. A food product slicer, comprising:

a base;

a knife mounted for rotation relative to the base;

a carriage assembly mounted to the base for reciprocal movement back and forth past a cutting edge of the knife, the carriage assembly having a full stroke length that extends from a most forward position toward a front side of the base and a end of stroke turnaround position toward a rear side of the base;

a drive for automatically moving the carriage for automated food product slicing;

a carriage position sensing arrangement for determining position of the carriage assembly;

an adjustable gauge plate mounted for movement between a closed position that prevents slicing and multiple open positions that permit slicing at respective thicknesses;

a member for varying position of the gauge plate between the closed and open positions;

a gauge plate closure sensing arrangement for detecting whether the gauge plate is in the closed position; and a controller operatively connected with the drive, the carriage position sensing arrangement and the gauge plate closure sensing arrangement, the controller configured such that, during movement of the carriage assembly for automated slicing, and upon the gauge plate closure sensing arrangement detecting that the gauge plate is in the closed position, the controller responsively initiates a shutdown operation and effects operation of the drive to bring the carriage assembly to a stop at a predefined location.

* * * * *